US005320897A

United States Patent [19]

Kondo et al.

[11] Patent Number: 5,320,897

[45] Date of Patent: Jun. 14, 1994

[54] INK JET RECORDING PAPER AND METHOD OF PRODUCING IT

[75] Inventors: Hiromasa Kondo; Yoshitaka Okumura; Hiromichi Yasuda, all of Amagasaki, Japan

[73] Assignee: Kanzaki Paper Mfg. Co., Ltd., Tokyo, Japan

[21] Appl. No.: 17,781

[22] Filed: Feb. 16, 1993

[30] Foreign Application Priority Data

Feb. 18, 1992 [JP] Japan ................................ 4-030321

[51] Int. Cl.[5] ................................................ B32B 9/00

[52] U.S. Cl. .................................... 428/195; 428/206; 428/211; 428/304.4; 428/328; 428/330; 428/331; 428/357; 428/913; 427/288

[58] Field of Search ............... 428/195, 211, 331, 913, 428/914, 201, 204, 206, 193, 304.4, 328, 330, 357, 913; 427/209, 256, 288

[56] References Cited

U.S. PATENT DOCUMENTS 4,460,637 7/1984 Miyamoto et al. .
4,902,568 2/1990 Morohoshi .
5,185,213 2/1993 Fujita et al. ........................ 428/500

FOREIGN PATENT DOCUMENTS 52-9074 1/1977 Japan .
55-51583 4/1980 Japan .
55-144172 11/1980 Japan .
55-146786 11/1980 Japan .
56-148583 11/1981 Japan .
57-36692 2/1982 Japan .
58-72495 4/1983 Japan .

*Primary Examiner*—Patrick J. Ryan
*Assistant Examiner*—William A. Krynski
*Attorney, Agent, or Firm*—Killworth, Gottman, Hagan & Schaeff

[57] ABSTRACT

An ink jet recording paper ensuring high image qualities and a method of producing the same. The paper has excellent ink receptivity, ink dryness, image density, color reproduction and image brightness. The paper is free from the strike through of Ink. The paper does not produce paper dust which affects the performance of the recording apparatus. The paper comprises a substrate and an ink receptive image-receiving layer thereon, the image-receiving layer being formed by coating or saturating the substrate with an aqueous coating composition, the improvement comprising the substrate satisfying the following two conditions at the same time:

(1) The substrate contains a porous pigment in an amount of 6 to 20% by weight, the pigment having an apparent specific gravity under JIS-K-6220 of 0.10 to 0.50 g/cm$^3$.

(2) The initial angle of contact $\theta$ of the surface of the substrate with water is 45° to 100°.

8 Claims, No Drawings

INK JET RECORDING PAPER AND METHOD OF PRODUCING IT

FIELD OF THE INVENTION

The present invention relates to an ink jet recording paper. More particularly, the invention relates to improvements in a recording paper used in apparatuses of various ink jet recording systems.

DESCRIPTION OF THE PRIOR ART

Ink jet recording systems are widely adopted in various printers and plotters because in these systems little noise is made, high-speed recording being possible and multi-color recording being easy. Recording mediums used in the ink jet recording systems include various papers such as wood free papers and coated papers as well as synthetic papers, cloths and plastic films. Attempts have been made to improve recording apparatuses and ink compositions so that the recording mediums have a higher efficiency and better image reproduction as well as to improve the recording mediums themselves.

However, none of said attempts have been successful and further efforts for improvements are expected. As the recording apparatuses are improved in the speed and preciseness of recording and the recording papers have wider applications such as multi-color recording and full-color recording, the ink jet recording papers are required to have higher properties as in the following:

(1) The papers absorb ink well and are free from feathering stains.
(2) Recorded images are clear. Resolution and image density are high.
(3) Lateral diffusion of ink dots is uniform and is not too large.
(4) The papers have high opacity and are free from the strike through of ink to the reverse side.
(5) Ink dries well. The papers are free from cockling and curls.
(6) Water resistance is high. Ink forming a recorded image in preservation does not flow out owing to moisture, etc.
(7) The papers are free from paper dust which may affect image qualities or with which the interior, nozzle, etc. of printers, plotters, etc. may be clogged.
(8) In case of color images, there is no color difference, color tone being bright, color reproduction and gradation being excellent.

Since an ink jet recording paper was first developed, attempts have been made to satisfy the above-mentioned requirements by providing a substrate with a coating layer (ink receptive layer) comprising a pigment and a binder which absorb ink well.

For example, the attempts include methods in which the pigment used comprises a silicic pigment (Japanese Patent Laid-Open Publication No. Sho 52-9074, Japanese Patent Laid-Open Publication No. Sho 55-51583, Japanese Patent Laid-Open Publication No. Sho 56-148583, Japanese Patent Laid-Open Publication No. Sho 58-72495, Japanese Patent Laid-Open Publication No. Sho 58-110287, etc.); methods in which the ink receptive layer comprises a water-soluble high-molecular coating layer (Japanese Patent Laid-Open Publication No. Sho 55-144172, Japanese Patent Laid-Open Publication No. Sho 55-146786, etc.); methods in which a basic latex polymer is used (Japanese Patent Laid-Open Publication No. Sho 57-36692, etc.); attempts in which a water-soluble high-molecular coating layer is subjected to ink Jet recording and then given a water-resisting agent (Japanese Patent Laid-Open Publication No. Sho 55-50396, Japanese Patent Laid-Open Publication No. Sho 56-8869, etc.); and means of using specific pigments and resins which absorb tinting components of aqueous ink (Japanese Patent Laid-Open Publication No. Sho 55-144172, etc). The conventional ink jet recording papers have various disadvantages and do not satisfy the requirements of ink receptivity and recorded image qualities. Thus the conventional ink jet recording papers do not have all the qualitative properties required.

Recently, with the development of office automation, printers, plotters, etc. utilizing ink jet recording systems have been widely used. Particularly, color recording by ink jet is being watched with keen interest. In the color recording, it has been required to increase the number of colors and improve resolution and color brightness with a view to reproducing a hue closer to the original image by means of limited color materials (inks). As a result, it has become inevitable to mix inks of different colors. This means an increase of the amount of ink put on the recording paper per area. This results in the strike through of ink to the reverse side, delayed drying of ink and unevenness of paper surface owing to the absorption of much ink. This has become an important problem to solve.

OBJECTS AND SUMMARY OF THE INVENTION

It is an object of the invention to provide an ink jet recording paper which has a high grade and ensures high image qualities.

It is another object of the invention to provide an ink jet recording paper having excellent ink receptivity, ink dryness, image density, color reproduction and color brightness.

It is a further object of the invention to provide an ink jet recording paper which is free from the strike through of ink and suitable for recording.

It is a still further object of the invention to provide an ink jet recording paper which is free from paper dust and does not affect the performance of the apparatus.

These and other objects have been attained by an ink jet recording paper comprising a substrate and an ink receptive image-receiving layer thereon, said image-receiving layer being formed by coating or saturating said substrate with an aqueous coating composition, the improvement comprising said substrate satisfying the following two conditions at the same time: (1) Said substrate contains a porous pigment in an amount of 6 to 20% by weight, said pigment having an apparent specific gravity under JIS-K-6220 of 0.10 to 0.50 g/cm$^3$. (2) The initial angle of contact $\theta$ of the surface of said substrate with water is 45° to 100°.

The present invention also includes a method of producing an ink jet recording paper comprising a substrate containing a porous pigment in an amount of 6 to 20% by weight, said pigment having an apparent specific gravity under JIS-K-6220 of 0.10 to 0.50 g/cm$^3$, said substrate also containing an internal sizing agent, a surface sizing agent being applied to the surface of said substrate by means of a size press so that the initial angle of contact $\theta$ of the surface of said substrate with water is 45° to 100°, an ink receptive image-receiving layer being formed on said substrate by coating or saturating said substrate with an aqueous coating composition, the main components of said coating composition being a pigment and a binder.

DETAILED DESCRIPTION

Generally speaking, in case of an ink jet recording system, if the ink receptivity of a recording paper is made too high, the recorded image density will be reduced, the brightness and reproduction of colors being lost and resolution being affected. Furthermore, the tinting components of ink will infiltrate close to the reverse side of the recording paper so that the strike through of ink is liable to occur. If the ink receptivity is made low, the image density will be higher but there will be disadvantages that the image qualities are reduced because of too thick printed letters, uneven shading, etc. and the recorded image is stained by rubbing because ink dryness is affected. This has been a dilemma concerning ink receptivity.

As a result of earnest study to solve the above-mentioned dilemma, the inventors have obtained an ink jet recording paper by specifying the water repellency of a substrate and the kind and amount of a filler contained in said substrate, as well as by specifying materials forming an ink receiving layer, these conditions combining to give said ink jet recording paper excellent qualities which can never be expected of the prior art.

The ink jet recording paper is obtained by a substrate being coated or saturated with an aqueous coating composition, the water repellency of said substrate being adjusted in the production process of an image-receiving paper so that the aqueous component of a binder within said coating composition pertinently infiltrates into the paper layer of said substrate, thereby paper strength being maintained, the recording paper being prevented from producing paper dust with which an ink nozzle of the recording apparatus may be clogged.

The ink jet recording paper according to the present invention comprises a substrate and an ink receptive image-receiving layer thereon, said image-receiving layer being formed by coating or saturating said substrate with an aqueous coating composition, the improvement comprising said substrate satisfying the following two conditions at the same time: (1) Said substrate contains a porous pigment in an amount of 6 to 20% by weight, said pigment having an apparent specific gravity under JIS-K-G220 of 0.10 to 0.50 g/cm$^3$. (2) The initial angle of contact $\theta$ of the surface of said substrate with water is 45° to 100°.

A first characteristic feature of the ink jet recording paper according to the present invention is that the substrate contains a porous pigment as a filler in an amount of 6 to 20%, preferably 7 to 16%, by weight, said pigment having an apparent specific gravity under JIS-K-6220 (hereinafter designated as "apparent specific gravity") of 0.10 to 0.50 g/cm$^3$, preferably 0.15 to 0.40 g/cm$^3$. Said porous pigment contains much air within its particles. Said porous pigment suitably disposed between pulp fibers gives the substrate excellent ability to capture tinting components within ink such as a direct dye and an acid dye. Therefore, troubles such as the strike through of ink and the reduction of dryness thereof are remedied and the quality of the ink jet recording paper including the brightness and color reproduction of the recorded image is remarkably improved.

If a porous pigment having an apparent specific gravity of above 0.50 g/cm$^3$ is used, the porous pigment will not have the above-mentioned property, the substrate becoming dense with decreased pores, the ability of the paper to capture the tinting components within ink being remarkably reduced. Therefore, it will be impossible to prevent the strike through of ink, image qualities being reduced by too thick printed letters, feathering or uneven shading, the printed image being stained by rubbing because ink does not dry well. Thus it is impossible to obtain the ink jet recording paper of the present invention having desired high image qualities. Furthermore, since pores necessary for scattering light are decreased, the opacity of the substrate is remarkably reduced. If a porous pigment having an apparent specific gravity of below 0.10 g/cm$^3$ is used, ink receptivity will be too high. Therefore, while the dryness of ink may be improved, there will be disadvantages that recording density is lowered by the sinking of ink, brightness and gradation being reduced, and partial cockles appearing, said cockles deteriorating the appearance of the paper. Furthermore, the strength of the paper layer is remarkably reduced, thereby troubles by paper dust being caused.

If the amount of the said porous pigment is below 6% by weight of the substrate, it is impossible to obtain the desired effects of the present invention. If the amount of the said porous pigment is above 20% by weight of the substrate, the paper layer strength of the substrate will be reduced and paper dust will be produced.

The porous pigment usable in the present invention may be for example as far as they have the above-mentioned apparent specific gravity: sea chestnut-shaped or spherical coagulated precipitated calcium carbonate comprising coagulated single particles, calcined kaolin, natural diatomaceous earth, calcined natural diatomaceous earth, fine-grained magnesium carbonate and fine-grained alumina. If said sea chestnut-shaped or spherical coagulated precipitated calcium carbonate or calcined kaolin is chosen from among said pigments, it is possible to obtain an excellent ink jet recording paper which is free from the feathering and strike through of ink.

Said sea chestnut-shaped or spherical coagulated precipitated calcium carbonate comprises single particles (or primary particles) coagulated hard to such an extent that coagulated particles (or secondary particles) are not separated by a normal dispersion force, said single particles being obtained when a calcium carbonate is synthesized and crystallized, said single particles having diameters of about 0.1 to 0.3 μm. In the sea chestnut-shaped coagulated precipitated calcium carbonate, said single particles are spicular. In the spherical coagulated precipitated calcium carbonate, said single particles are cubical or rhombohedral. The diameters of said coagulated particles can be controlled in a range of 0.5 to 20 μm. Particularly, coagulated particles having diameters of 1 to 10 μm attract attention for use in paper making.

Said calcined kaolin, which is also called anhydrous kaolin, is divided into many kinds according to the degree of calcination, particle sizes, etc.

Porous pigments having a very high surface activity, such as amorphous silica and zeolite, are not preferable because they may affect the color reproduction of dye contained in ink and remarkably reduce the light resistance of the recorded image.

In addition to said fillers, it is possible to use any one or more of the following fillers for example within a range not affecting the desired effects of the present invention: mineral pigments such as talc, kaolin, clay, delaminated kaolin, ground calcium carbonate, precipitated calcium carbonate, magnesium carbonate, titanium dioxide, alumina trihydrate, calcium hydroxide, magnesium hydroxide, zinc oxide, magnesium sulfate, calcium silicate, aluminium silicate, magnesium silicate, calcium sulfate, silica, sericite, bentonite and smectite; and corpuscles and hollow corpuscles of organic synthetic pigments such as polystyrene resin, urea resin, acrylic resin, melamine resin and benzoguanamine resin. Also, fillers contained in waste paper, broke, etc. may be regenerated and used.

A second characteristic feature of the present invention is that the initial angle of contact $\theta$ of the surface of the substrate with water is 45° to 100°, preferably 50° to 95°, thereby the aqueous component of the coating composition being pertinently infiltrated into the substrate, thus the adhesion of the paper layers and between the paper layers and the image-receiving layer being made stronger, and a smooth and uniform ink receptive surface layer being formed. Furthermore, the recording paper Is given suitable repellency and the strike through of ink is prevented.

Stöckigt sizing degree, water absorptiveness by means of Cobb test, etc. generally give an index to the water repellency of a paper. However, these methods are not suitable as such an index when an aqueous coating composition is applied to the substrate because determination requires much time as compared with the infiltration time of the coating composition into the substrate and furthermore determined values are much influenced by the basis weight of the paper.

Thus, in the present invention, an angle of contact method is newly employed, which method makes it possible to accurately measure the degree of infiltration of an aqueous coating composition into the substrate in a process of coating or saturating said substrate with said aqueous coating composition.

The angle of contact in the present invention is a value determined in accordance with TAPPI STD T 458 om-84 "Surface wettability of paper (angle of contact method)". In this method, the angle of contact between a drop of distilled water and a paper surface is determined. The initial angle of contact $\theta$ is determined 5 seconds after a small drop of water is placed on the paper surface.

If the water repellency of the substrate is increased to such an extent that the angle of contact $\theta$ exceeds 100°, the binder, which is an aqueous component of the coating composition, is less likely to infiltrate into the substrate and it is impossible to obtain a desired strong recording paper of the present invention. In this case, paper dust is liable to be produced, which paper dust may clog the ink nozzle, etc. and affect the image qualities.

If the angle of contact $\theta$ is below 45°, said aqueous component of the coating composition infiltrates into the substrate too much. Therefore, the surface of the ink receptive layer becomes uneven and rough. In other words, the ink receptive layer cannot have a smooth and uniform surface. The image qualities are remarkably reduced by uneven shading and partial curls. Furthermore, ink is absorbed nearly to the reverse side of the recording paper and the strike through of ink is inevitable.

The angle of contact $\theta$ can be adjusted by changing any of the following: the kind and amount of internal sizing agent or other wet-end additives; the kind and amount of surface sizing agent; the kind of pulp; the beating conditions of pulp; the kind and amount of filler; the distribution, formation, etc. of ash within the substrate; paper making conditions such as water temperature, pH, zeta potential, dewatering conditions and drying conditions; and the degree of calendering. If the angle of contact $\theta$ is adjusted by adding a large amount of internal sizing agent, the ink absorbency of the substrate may be extremely reduced. Therefore, both of the internal sizing agent and the surface sizing agent are preferably used to obtain the desired effects of the present invention. In this case, the internal sizing agent should be used in an amount of 0.01 to 0.3%, preferably 0.02 to 0.25%, by weight of the substrate. The surface smoothness of the substrate has an influence on the angle of contact $\theta$. If the substrate is calendered and said adjusting means is used, the angle of contact $\theta$ can be adjusted more accurately.

In the present invention, any of the following internal sizing agents for example may be used: rosin sizes such as saponified rosin size, rosin emulsion size, alkylketene dimer size, alkenyl maleic anhydride size, higher fatty acid size, resin size, wax size and cationic synthetic size.

In the present invention, any of synthetic sizes such as $\alpha$-olefine-maleic anhydride size and styrene-acrylate size as well as said internal sizing agents may be used as a surface sizing agent. These surface sizing agents may be used together with any of the following for example: starch, polyacrylamide, polyvinyl alcohol, cellulose derivative, acrylate ester, latex, their derivatives and modified resins.

Said surface sizing agents may be applied to the substrate by any means for example as follows: size presses of two-roll type, gate-roll type, mete ring blade type, Billblade type, etc. and coaters of short dwell type, roll type, air knife type, blade type, spray type, etc. Any of said size presses is most preferably used in the present invention.

To obtain color recording, inks of 4 colors (black, cyan, magenta and yellow) are generally used. Other colors are obtained by mixing these inks. Many of generally used color ink Jet printers are of a serial type in which recorded images are obtained by flying inks from a head (ink nozzle) to the surface of a recording paper each time said head moves forward or backward between two points. In a portion of mixed colors, colors are laid one upon the other in certain order when the head moves forward, and the order is reversed when the head moves backward. In case of a recording paper having a high ink absorbing speed as in a water leaf paper, the tone of the portion of mixed colors looks different according to the order in which the colors are laid one upon the other, that is, according as the head moves forward or backward. This causes color difference and much reduces the qualities of recorded images.

In case of a recording paper having a low ink absorbing speed, inks applied by the head moving forward are not absorbed sufficiently by the time when inks are laid by the head moving backward. This causes unnecessary mixing of inks and affects the brightness of colors and the sharpness of image edges.

If the rate of change of the angle of contact R of the surface of the substrate with water is adjusted to a range of 0.9° to 0.1°/second, preferably 0.85° to 0.15°/second, it is possible to eliminate the above-mentioned drawbacks and obtain recorded images having clear hues and high qualities. This case forms one of preferred examples of the present invention. The rate of change of the angle of contact is calculated as follows:

$$R=(\theta-\theta')/55$$

where

R: the rate of change of the angle of contact $\theta$: the initial angle of contact (after 5 seconds)

$\theta'$: the angle of contact after 60 seconds

If the rate of change of the angle of contact R is above 0.9°/second, the ink absorbing speed of the recording paper obtained will be too high. This causes color difference and tends to reduce recording density. If the rate of change of the angle of contact R is below 0.1°/second, the ink absorbing speed of the recording paper obtained will be too low and ink dryness will be extremely deteriorated. This may result in unnecessary mixing of inks, faded images and unsharpened edge portions. The rate of change of the angle of contact R can be adjusted by the above-mentioned means for adjusting said angle of contact $\theta$.

Pulps forming the substrate are not limited. The main pulp used is a usual wood fiber pulp. The following pulps may also be used as required: non-woody fiber pulps such as kenaf, bamboo and hemp; synthetic pulps and synthetic fibers such as polyester, polyolefin and polyamide; inorganic fibers such as glass fiber and ceramic fiber. Methods, etc. of producing pulps are not limited, either. For example, it is also possible to use chemical pulps or semichemical pulps such as softwood pulps and hardwood pulps obtained by a KP method, SP method, AP method, etc.; high yield pulps such as SGP, BSGP, BCTMP, CTMP, CGP, TMP, RGP and CMP; and waste paper stock or recycled paper stock such as DIP.

The paper stuff, the main components of which are a pulp and fillers, may further contain any of conventional wet-end additives such as a retention aid agent, drainage acid agent and strength agent to such an extent that they do not affect the desired effects of the present invention.

It is also possible to add, as required, wet-end additives such as a dyestuff, fluorescent whitening agent, pH control agent, anti-foaming agent, pitch control agent and slimecide. When said surface sizing agents are applied, a fluorescent whitening agent, water-resisting agent, anti-foaming agent, antistatic agent, pigment, dyestuff, etc. may be applied together with the surface sizing agents.

Any paper making method may be used in the present invention. For example, it is possible to use an acidic paper making method in which the paper making pH is about 4.5, as well as a neutral paper making method in which an alkaline filler such as calcium carbonate is contained as a main component and the paper making pH is about 6 (slightly acidic) to about 9 (slightly alkaline). Usable paper machines include a Fourdrinier paper machine, twin wire paper machine, cylinder paper machine, etc.

In the present invention, an ink receptive layer is formed by coating or saturating the substrate with an aqueous coating composition in order to obtain an ink jet recording paper having desired high image qualities.

Said aqueous coating composition contains a binder which may be any of the following water soluble and/or water dispersible high-molecular compounds: starch derivatives such as cationic starch, amphoteric starch, oxidized starch, enzyme modified starch, thermal chemical converted starch, starch esters and starch ethers; cellulose derivatives such as carboxymethyl cellulose and hydroxyethyl cellulose; natural or semisynthetic high-molecular compounds such as casein, gelatin and soyabean protein; polyvinyl alcohols such as completely or partially saponified polyvinyl alcohol, acetoacetic polyvinyl alcohol, carboxyl modified polyvinyl alcohol, olefin modified polyvinyl alcohol and silil modified polyvinyl alcohol; urea resin; melamine resin; epichlorhydrine resin; epoxy resin; alkyd resin; polyurethane resin; polyethyleneimine; polyamide resin; polyvinylpyrrolidone resin; polyvinylbutyral resin; poly(meth)acrylic acid or copolymer thereof; acrylate resin; acrylic amide resin; maleic anhydride copolymer; polyester resin; styrene-butadiene copolymer latex; methyl methacrylate-butadiene copolymer latex; acrylic acetate copolymer latexes such as acrylic ester copolymer; vinyl copolymer latexes such as ethylene-vinyl acetate copolymer; modified latexes comprising any of said copolymer latexes provided with anionic group and/or cationic group; and cationic resin as a dye binder. One or more of these binders may be chosen according to the desired qualities of the ink jet recording paper.

Said cationic resin as a die binder may any of the following: polymer of methacrylate quaternary ammonium salt, polymer of diallylamine salt, polymer of monoacrylamine salt, copolymer of diallylamine salt and monoacrylamine salt, copolymer of dimethyl acrylamine salt and (meth)acrylamide, etc. These are chosen so that water resistance and light resistance are well balanced. Particularly, a cationic resin containing a copolymer of diallylamine and (meth)acrylamide is preferably used because it increases the light resistance and the resistance to radical attack of dye. If this resin is used too much, ink dryness will be rapidly affected. This resin is usually applied to the surface of the substrate in an amount of about 0.2 to 3 $g/m^3$, preferably about 0.25 to 2.5 $g/m^2$.

To obtain clearer recorded images, an ink receptive layer is preferably formed by coating or saturating the substrate with an aqueous coating composition comprising a pigment as well as said binder.

The pigment may be any of the following conventional pigments: mineral pigments and porous pigments such as kaolin, delaminated kaolin, alumina trihydrate, satin white, ground calcium carbonate, precipitated calcium carbonate, calcium sulfate, barium sulfate, titanium dioxide, calcined kaolin, talc, silica, amorphous silica, zinc oxide, zinc carbonate, zinc sulfide, alumina, fine-grained alumina, natural diatomaceous earth, calcined diatomaceous earth, white carbon, aluminium silicate, calcium silicate, magnesium silicate, magnesium aluminosilicate, magnesium oxide, magnesium carbonate, aluminosilicate, colloidal silica, activated clay, bentonite, zeolite, sericite and lithophone; and corpuscles, porous corpuscles and hollow corpuscles of organic pigments such as polystyrene resin, urea resin, acrylic resin, melamine resin and benzoguanamine resin. One or more of these pigments may be chosen according to the desired qualities of the ink jet recording paper.

Among these pigments, said porous pigments and porous corpuscles are preferably used because they have excellent ink receptivity and effectively contribute to transferring the aqueous ink medium to the substrate and maintaining the tinting components thereof. The porous pigments and porous corpuscles may be of any kind and produced by any method. It is desirable that the porous pigments and porous corpuscles have a specific surface area under the BET specific surface area method of above 150 $m^2/g$, preferably above 200 $m^2/g$, and a mean particle diameter (determined by means of a coulter counter at AP = 50 μm) of 0.5 to 15 μm, preferably 1 to 10 μm, in a state of dispersion within an aqueous coating composition for an ink receptive layer.

To obtain the desired effects of the present invention, It is desirable to use a pigment in an amount of 0 to 95%, preferably 10 to 90%, by weight of the total solid matter of the aqueous coating composition. To increase the brightness of the recording paper, it is desirable to use a pigment having a powder whiteness of above 75%, preferably above 80%.

In addition to the pigment and binder, the coating composition may contain, as required, any of the following auxiliary agents for example: thickener, mold releasing agent, wetting agent, gelling agent, sizing agent, anti-foaming agent, antifoamer, foaming agent, colorant, fluorescent whitening agent, ultraviolet absorbent, antioxidant, quencher, antiseptic agent, antistatic agent, cross-linking agent, dispersing agent, lubricant, plasticizer, pH control agent, flow modifier, hardener and water-resisting agent. If a coating composition containing the above-mentioned various components does not uniformly disperse because of coagulation, etc., it is possible to prepare two or more coating compositions and apply them separately to obtain the desired ink receptive layer.

The substrate is coated or saturated with the coating composition thus prepared. The coating composition should not be used too much. The amount of the coating composition should suit the property of the substrate and satisfy the ink jet recordability including ink receptivity. Usually the coating composition is applied in an amount of 0.5 to 20 $g/m^2$ per side, dry basis. If the amount of the coating composition exceeds 20 $g/m^2$ per side, it is difficult to make the most of the property of the substrate and furthermore troubles by paper dust attributable to the image-receiving layer and problems such as breaking are liable to occur. If the amount of the coating composition is below 0.5 $g/m^2$ per side, it is difficult to obtain the ink jet recording paper of the present invention having desired high image qualities. Therefore, the coating composition should be applied in an amount of 0.5 to 20 $g/m^2$, preferably 1 to 15 $g/m^2$, more preferably 2 to 12 $g/m^2$, per side.

Means for coating or saturating the substrate with the coating composition may be any of the following for example: conventional coaters such as a blade coater, air knife coater, roll coater, reverse roll coater, bar coater, curtain coater, die slot coater, gravure coater, Champflex coater, brush coater, two-roll size press coater, metering blade size press coater, gate roll coater, Billblade coater, short-dwell coater, or conventional saturators such as a pre-wet saturator, float saturator, squeeze roll saturator, and doctor bar saturator. These may be either on-machine devices or off-machine devices.

The ink jet recording paper thus coated or saturated is smoothed in a normal drying process, surface treatment process, etc. and finished as a paper having a moisture content of about 3 to 10 % by weight, preferably about 4 to 8 % by weight. Usually, the substrate is smoothed in the normal drying process, etc., but it is also possible to pass it through a pressure nip comprising a heated metal roll and a heated or non-heated elastic roll.

Either or both of the two sides of the recording paper may be subjected to surface treatments such as an antistatic treatment and a treatment for giving writability (printability). Also, auxiliary agents such as ultraviolet absorbent and antioxidant may be contained in an arbitrary position of the substrate in order that recorded images are preserved better.

EXAMPLES AND COMPARATIVE EXAMPLES

The following are some examples of the present invention. It is to be noted that the scope of the invention is not limited to these examples. "Parts" and "%" in the following examples and comparative examples respectively mean "parts by weight" and "% by weight" unless otherwise stated.

Ink jet recording papers and substrates obtained in the examples and comparative examples were subjected to determination and quality evaluation, the results of which are shown in Tables 1 and 2.

Determination of Initial Angle of Contact and Rate of Change of Angle of Contact An initial angle of contact in case of distilled water was determined by a method specified in TAPPI STD T 458 om-84 "Surface wettability of paper (angle of contact method)". The angle of contact was determined by means of "FACE Angle of Contact Method Model CA-D" (made by Kyowa Kaimen Kagaku Co., Ltd., Japan).

The initial angle of contact means an angle of contact determined 5 seconds after a small drop of water is placed on the paper surface. The rate of change of the angle of contact was calculated as follows:

$$R=(\theta-\theta')/55$$

where

R: the rate of change of the angle of contact

θ: the initial angle of contact (after 5 seconds)

θ: the angle of contact after 60 seconds

Determination of Chromaticness Index (Color Reproduction) in Color Developed Portion of Recorded Image A test pattern was recorded by means of a recording apparatus ("Image Jet Printer IO-735" made by Sharp Corporation, Japan). The chromaticness indexes (a*, b*) of a part colored red and a part colored green in the recorded portion were determined by means of "ELREPHO 2000" (made by Datacolor, USA).

As mentioned in "Japanese Journal of Pulp and Paper Technology" Vol. 22, No. 11 (November 1979), pages 58 to 61, the relationship between the chromaticness index (a*, b*) and color is as follows: As the value of the chromaticness index a* increases on the positive side, the color reproduction of red is superior (The degree of red is larger.). As the value of the chromaticness index a* increases on the negative side, the color reproduction of green is superior (The degree of green is larger.).

Evaluation of Brightness (Metric Chroma) of Recorded Image

On the basis of the determined values of said chromaticness indexes, the metric chroma (C*) was obtained as in the following, and the brightness of the part colored red and the part colored green in the recorded portion was evaluated.

$$C^*=\{(a^*)^2+(b^*)^2\}^{\frac{1}{2}}$$

As the value of C* increases, the brightness is superior.

Evaluation of Qualities of Recorded Image

The qualities of the recorded image on said recorded portion were visually evaluated, the results of which are shown in Table 2 by the following relative valuations:

◎: Very good. No color difference or uneven shading was found. Color tone was bright.

○: Good. Almost no color difference or uneven shading was found. Color tone was bright.

Δ: Poor. Color difference and uneven shading were found. Color tone was not bright.

Evaluation of Strike Through of Ink

After said recording, the degree of ink bleeding on the reverse side of the recording paper was visually evaluated, the results of which are shown in Table 2 by the following relative valuations:

◎: Very good. No strike through of ink was found.

○: Good. Almost no strike through of ink was found.

Δ: Slightly poor. Some strike through of ink was found.

×: Not practicable. Strike through of ink was found.

Evaluation of Ink Dryness

Immediately after recording, said recorded portion was rubbed with gauze. The degree of stain by spread ink was visually evaluated, the results of which are shown in Table 2 by the following relative valuations:

◎: Very good. No stain was found.

○: Good. Almost no stain was found.

Δ: Slightly poor. Some stain was found.

×: Poor. Much stain was found.

Production of Paper Dust

The paper was cut by means of a cutter. At that time, the production of paper dust was visually evaluated, the results of which are shown in Table 2 by the following relative valuations:

○: Good. Almost no paper dust was found.

Δ: Slightly poor. Some paper dust was found.

×: Poor. Much paper dust was found.

EXAMPLE 1

Preparation of Substrate

A pulp slurry comprising 10 parts NBKP (spruce, freeness: CSF 520 ml) and 90 parts LBKP (maple, freeness: CSF 460 ml) was mixed with 10 parts spherical coagulated precipitated calcium carbonate (apparent specific gravity: 0.38 g/cm$^3$) as a filler, 0.5 part alum, 0.5 part cationic starch and 0.03 part alkylketene dimer. This mixture was diluted with white water to obtain a paper stuff having a pH of 7.9 and a solids content of 0.9%. This paper stuff was made into a paper by means of a twin wire machine. Then, oxidized starch and maleic anhydride surface sizing agent were applied to the paper by means era size press so that the coating weights, dry basis, were respectively 2 g/m$^2$ and 0.03g/m$^2$. Then the paper was dried and passed through a 3-nip machine calender. Thus a substrate having a basis weight of 76 g/m$^2$ was obtained.

Preparation of Coating Composition 100 parts (solid matter, hereinafter the same) porous pigment (specific surface area: 250 m$^2$/g, mean particle diameter: 3.7 μm), the main component of which was amorphous silica, was dispersed in 5 parts (ratio of solid matter to pigment, hereinafter the same) cationic resin containing a copolymer of diallylamide and methacrylamide as a component thereof and agitated by means of a Cowless dissolver. This was mixed with 25 parts cationic polyvinyl alcohol, 20 parts oxidized starch, 1 part fluorescent whitening agent, anti-foaming agent and water. This mixture was agitated to obtain a coating composition having a solids content of 15% by weight.

Formation of Ink Receptive Layer

The coating composition thus obtained was applied to one side of said substrate by means of an air knife coater so that the coating weight, dry basis, was 8 g/m$^2$. The substrate was dried and passed through a super calender. Thus an ink jet recording paper having a basis weight of 84 g/m$^2$ was obtained.

EXAMPLE 2

An ink jet recording paper was obtained in the same way as in Example 1 except that in the preparation of the substrate the amount of said spherical coagulated precipitated calcium carbonate was 15 parts and the amount of said cationic starch was 1.0 part.

EXAMPLE 3

An ink jet recording paper was obtained in the same way as in Example 1 except that in the preparation of the substrate 7 parts sea chestnut-shaped precipitated calcium carbonate and 3 parts talc (apparent specific gravity: 0.75 g/cm$^3$) were used as fillers and said sizing agent was replaced by 0.1 part neutral rosin size.

EXAMPLE 4

An ink jet recording paper was obtained in the same way as in Example 1 except that in the preparation of the substrate the amount of said alkylketene dimer was 0.08 part and oxidized starch and polyvinyl alcohol were used as sizing agents, the coating amount of said oxidized starch being 1.5 g/m$^2$, the coating amount of said polyvinyl alcohol being 1.0 g/m$^2$.

EXAMPLE 5

An ink jet recording paper was obtained in the same way as in Example 1 except that in the preparation of the substrate said filler was replaced by 10 parts spherical precipitated calcium carbonate (apparent specific gravity: 0.32 g/cm$^3$).

Comparative Example 1

An ink jet recording paper was obtained in the same way as in Example 1 except that in the preparation of the substrate said filler was replaced by 10 parts spindle-shaped precipitated calcium carbonate (apparent specific gravity: 0.59 g/cm$^3$).

Comparative Example 2

An ink jet recording paper was obtained in the same way as in Example 1 except that in the preparation of the substrate said filler was replaced by 25 parts precipitated calcium carbonate (apparent specific gravity: 0.56 g/cm$^3$) and the amount of said alkylketene dimer was increased to 0.1 part.

Comparative Example 3

An ink jet recording paper was obtained in the same way as in Example 3 except that in the preparation of the substrate said filler was replaced by 20 parts ground calcium carbonate (apparent specific gravity: 0.80 g/cm$^3$).

Comparative Example 4

An ink jet recording paper was obtained in the same way as in Example 3 except that in the preparation of the substrate the ratio of said fillers was changed to 4 parts spherical coagulated precipitated calcium carbonate and 3 parts talc.

Comparative Example 5

An ink jet recording paper was obtained in the same way as in Example 1 except that in the preparation of the substrate the amount of said alkylketene dimer was decreased to 0.01 part and the surface sizing agent was changed to water only.

Comparative Example 6

An ink jet recording paper having a basis weight of 84 g/m$^2$ was obtained in the same way as in Example 1 except that in the preparation of the substrate the coating weight, dry basis, of maleic anhydride surface sizing agent was changed to 0.20 g/m$^2$.

Comparative Example 7

An ink jet recording paper was obtained in the same way as in Example 2 except that in the preparation of the substrate the machine calender was not used.

EXAMPLE 6

Preparation of Substrate

A pulp slurry comprising 5 parts NBKP (spruce, freeness: CSF 520 ml) and 95 parts LBKP (eucalyptus, freeness: CSF 440 ml) was mixed with 10 parts calcined kaolin (apparent specific gravity: 0.34 g/cm$^3$) as a filler, 0.1 part rosin emulsion sizing agent, 2.0 parts alum and 0.2 part cationic starch. This mixture was diluted with white water to obtain a paper stuff having a pH of 5.1 and a solids content of 1.0 %. This paper stuff was made into a paper by means of a Fourdrinier paper machine. Then, oxidized starch and styrene-acrylic surface sizing agent were applied to the paper by means of a size press so that the coating weights, dry basis, were respectively 2 g/m$^2$ and 0.03 g/m$^2$. Then the paper was dried and passed through a 3-nip machine calender. Thus a substrate having a basis weight of 76 g/m$^2$ was obtained.

Preparation of Coating Composition 70 parts amorphous silica (specific surface area: 250 m$^2$/g, mean particle diameter: 3.7 μm) and 30 parts amorphous silica (specific surface area: 300 m$^2$/g, mean particle diameter: 20 μm) were mixed with 5 parts cationic resin containing a copolymer of diallylamide and methacrylamide as a component thereof, 1 part fluorescent whitening agent and 0.05 part anti-foaming agent and agitated by means of a Cowless dissolver. This was mixed with 15 parts of said cationic resin, 40 parts completely saponified polyvinyl alcohol and water. This mixture was agitated to obtain a coating composition having a solids content of 15% by weight.

Formation of Ink Receptive Layer

The coating composition thus obtained was applied to one side of said substrate by means of a bar coater so that the coating weight, dry basis, was 8 g/m$^2$. The substrate was dried and passed through a super calender. Thus an ink jet recording paper having a basis weight of 84 g/m$^2$ was obtained.

EXAMPLE 7

A substrate and an ink jet recording paper were obtained in the same way as in Example 6 except that in the preparation of the substrate the amount of calcined kaolin was increased to 16 parts, the amount of cationic starch being increased to 1.5 parts and the amount of rosin emulsion sizing agent being increased to 0.2 part.

EXAMPLE 8

A substrate and an ink jet recording paper were obtained in the same way as in Example 6 except that in the preparation of the substrate the amount of calcined kaolin was decreased to 7 parts, the surface sizing agent being oxidized starch only, said styrene-acrylic surface sizing agent not being used, the coating amount of said surface sizing agent being 1.5 g/m$^2$.

EXAMPLE 9

A substrate and an ink jet recording paper were obtained in the same way as in Example 6 except that in the preparation of the substrate the Filler was replaced by 10 parts calcined kaolin (apparent specific gravity: 0.43 g/cm$^3$).

Comparative Example 8

A substrate and an ink jet recording paper were obtained in the same way as in Example 6 except that in the preparation of the substrate the filler was replaced by 15 parts kaolin (apparent specific gravity: 0.60 g/cm$^3$), the surface sizing agent being oxidized starch only, said styrene-acrylic surface sizing agent not being used, the coating amount of said surface sizing agent being 1.5 g/m$^2$.

Comparative Example 9

A substrate and an ink jet recording paper were obtained in the same way as in Example 6 except that in the preparation of the substrate the amount of calcined kaolin was increased to 22 parts, the amount of cationic starch being increased to 2.0 parts and the amount of rosin emulsion sizing agent being increased to 0.3 part.

Comparative Example 10

A substrate and an ink jet recording paper were obtained in the same way as in Example 6 except that in the preparation of the substrate the filler was replaced by 10 parts fine-grained calcium silicate (apparent specific gravity: 0.09 g/cm$^3$).

As apparent from the Examples, the ink jet recording paper according to the present invention was free from the strike through of ink and troubles by paper dust. Also, said ink jet recording paper had satisfactory ink dryness as well as excellent qualities in the color reproduction and brightness of the recorded portion.

TABLE 1

| | Initial angle of contact Θ (°) of surface of substrate | Rate of change of angle of contact (°/second) of surface of substrate |
|---|---|---|
| Example 1 | 79 | 0.22 |
| 2 | 58 | 0.51 |
| 3 | 90 | 0.18 |
| 4 | 52 | 0.76 |
| 5 | 83 | 0.36 |
| 6 | 85 | 0.67 |
| 7 | 66 | 0.78 |
| 8 | 88 | 0.27 |
| 9 | 78 | 0.55 |
| Comp. Example 1 | 95 | 0.13 |
| 2 | 56 | 0.42 |
| 3 | 63 | 0.20 |
| 4 | 84 | 0.18 |
| 5 | 38 | 0.69 |
| 6 | 101 | 0.11 |
| 7 | 37 | 0.67 |
| 8 | 63 | 0.85 |
| 9 | 54 | 0.98 |
| 10 | 45 | 0.82 |

TABLE 2

| | Part colored red | | | Part colored green | | | | | | |
|---|---|---|---|---|---|---|---|---|---|---|
| | Chromaticness index | | Metric chroma | Chromaticness index | | Metric chroma | Image qualities | Strike through | Ink dryness | Paper dust |
| | a* | b* | c* | a* | b* | c* | | | | |
| Example 1 | 63.9 | 41.5 | 76.2 | −66.6 | 30.9 | 73.4 | ⊚ | ○ | ⊚ | ○ |
| 2 | 64.4 | 41.7 | 76.7 | −67.4 | 31.2 | 74.3 | ⊚ | ⊚ | ⊚ | ○ |
| 3 | 61.7 | 38.8 | 72.9 | −63.9 | 29.0 | 70.2 | ○ | ○ | ○ | ○ |
| 4 | 62.2 | 39.1 | 73.5 | −65.3 | 29.8 | 71.8 | ○ | ○ | ⊚ | ○ |
| 5 | 63.8 | 41.0 | 75.8 | −67.0 | 30.5 | 73.6 | ⊚ | ○ | ⊚ | ○ |
| 6 | 63.6 | 40.6 | 75.5 | −66.2 | 30.3 | 72.8 | ⊚ | ⊚ | ○ | ○ |
| 7 | 63.9 | 41.1 | 76.0 | −66.5 | 30.7 | 73.2 | ⊚ | ○ | ○ | ○ |
| 8 | 62.1 | 38.9 | 73.3 | −65.0 | 29.5 | 71.4 | ○ | ○ | ○ | ○ |
| 9 | 60.5 | 37.6 | 71.2 | −63.3 | 28.6 | 69.5 | Δ | ○ | ○ | ○ |
| Comp. 1 | 49.1 | 25.3 | 55.2 | −47.8 | 22.6 | 52.9 | Δ | x | Δ | ○ |
| Example 2 | 55.2 | 31.1 | 63.4 | −57.2 | 26.5 | 63.0 | Δ | Δ | ○ | x |
| 3 | 48.7 | 24.7 | 54.6 | −46.7 | 22.1 | 51.7 | Δ | x | Δ | ○ |
| 4 | 58.5 | 36.2 | 68.8 | −60.6 | 28.0 | 66.8 | Δ | Δ | Δ | ○ |
| 5 | 55.8 | 31.7 | 64.2 | −58.3 | 27.3 | 64.4 | Δ | x | ⊚ | Δ |
| 6 | 64.0 | 41.9 | 76.5 | −66.9 | 31.2 | 73.8 | ○ | ○ | x | Δ |
| 7 | 58.9 | 36.3 | 69.2 | −61.0 | 28.1 | 67.2 | Δ | Δ | ○ | ○ |
| 8 | 50.4 | 25.4 | 56.5 | −52.1 | 22.4 | 56.7 | Δ | Δ | ○ | ○ |
| 9 | 58.2 | 35.8 | 68.3 | −60.3 | 27.9 | 66.4 | Δ | Δ | ○ | Δ |
| 10 | 58.7 | 36.5 | 69.1 | −61.2 | 28.3 | 67.4 | Δ | Δ | ○ | x |

What is claimed is:

1. An ink jet recording paper comprising a paper substrate which has been calendered and an ink receptive image-receiving layer thereon, said image receiving layer being formed by coating or saturating said substrate with an aqueous composition comprising a porous pigment having an apparent specific gravity under JIS-K-6220 of 0.10 to 0.50 g/cm$^3$ in an amount of 6 to 20% by weight, the surface of said ink jet recording paper when contacted with water providing an initial angle of contact $\theta$ of 45° to 100°.

2. An ink jet recording paper as claimed in claim 1 wherein said aqueous coating composition includes a binder applied to said surface of said substrate in an amount of about 0.2 to 3 g/m$^3$.

3. An ink jet recording paper as claimed in claim 1 wherein said porous pigment is selected from the group consisting of sea chestnut-shaped or spherical coagulated precipitated calcium carbonate, calcined kaolin, natural diatomaceous earth, calcined natural diatomaceous earth, fine-grained magnesium carbonate and fine-grained alumina.

4. An ink jet recording paper as claimed in claim 1, wherein said porous pigment comprises sea chestnut-shaped or spherical coagulated precipitated calcium carbonate.

5. An ink jet recording paper as claimed in claim 1, wherein the rate of change of the angle of contact R of the surface of said substrate with water is 0.9 to 0.1°/second.

6. A method of producing an ink jet recording paper comprising the steps of forming a paper substrate containing an internal sizing agent, applying a surface sizing agent to the surface of said paper substrate, drying said paper substrate and calendering, and forming an ink receptive image-receiving layer on said paper substrate by coating or saturating said substrate with an aqueous composition comprising a porous pigment having an apparent specific gravity under JIS-K-6220 of 0.10 to 0.50 g/cm$^3$ in an amount of 6 to 20% by weight, to provide the surface of said ink jet recording paper when contacted with water an initial angle of contact $\theta$ of 45° to 100°.

7. A method of producing an ink jet recording paper as claimed in claim 6, wherein said binder is applied to said surface of said substrate in an amount of about 0.2 to 3 g/m$^2$.

8. A method of producing an ink jet recording paper as claimed in claim 6, wherein said porous pigment comprises sea chestnut-shaped or spherical coagulated precipitated calcium carbonate.

* * * * *